Feb. 16, 1965　　　P. E. HOFFMEISTER　　　3,169,319
POSITION INDICATOR

Filed May 11, 1962　　　　　　　　　　　　　6 Sheets-Sheet 1

INVENTOR.
Philip E. Hoffmeister,
BY
Paul & Paul
ATTORNEYS.

Feb. 16, 1965 P. E. HOFFMEISTER 3,169,319
POSITION INDICATOR
Filed May 11, 1962 6 Sheets-Sheet 2

INVENTOR.
*Philip E. Hoffmeister,*
BY
*Paul & Paul*
ATTORNEYS.

Feb. 16, 1965     P. E. HOFFMEISTER     3,169,319
POSITION INDICATOR

Filed May 11, 1962     6 Sheets—Sheet 5

INVENTOR.
Philip E. Hoffmeister,
BY
Paul & Paul
ATTORNEYS.

Feb. 16, 1965  P. E. HOFFMEISTER  3,169,319
POSITION INDICATOR

Filed May 11, 1962  6 Sheets-Sheet 6

INVENTOR.
Philip E. Hoffmeister,
BY
Paul & Paul
ATTORNEYS.

United States Patent Office 3,169,319
Patented Feb. 16, 1965

3,169,319
POSITION INDICATOR
Philip E. Hoffmeister, 2400 Halifax Drive,
Daytona Beach, Fla.
Filed May 11, 1962, Ser. No. 194,095
6 Claims. (Cl. 33—61)

This invention relates to a position indicator and, in particular, to an instrument and method of use by which the location of an observer on the earth's surface may be determined in terms of longitude and latitude by reference to the stars of the celestial sphere.

Many of the prior art instruments which provide means for determining the observer's location on the earth's surface required the use of elaborate tables and calculations before the approximate position of the observer can be determined. Other devices of the prior art require manipulation of relatively complicated instruments which are often exacting in measurement but require precision engineering and construction and which are not basically designed for utilization by amateurs and students of astronomy or navigation.

Therefore, it is an object of this invention to provide an instrument by which an observer may determine his position on the earth's surface in terms of longitude and latitude in relation to the position of selected stars.

It is another object of this invention to provide a position indicating instrument and method which may be utilized to the fullest extent by amateurs and students without the use of calculations and reference to mathematical tables.

It is another object of this invention to provide a relatively uncomplicated instrument so as to make identification of stars, the study of astronomy and celestial navigation easily understood by the student by teaching the basic relationships existing between an observer's position upon the earth's surface and the stars of the celestial sphere.

It is another object of this invention to provide a position indicating instrument which is reasonably simple to operate, one which is fabricated from a few materials not requiring precision manufacturing, and one which will resist damage likely with frequent use at the hands of students or amateurs. Other objects and advantages of the instrument and method of my invention will become more apparent herein and in the drawings attached hereto wherein:

FIG. 9 is a sectional view showing a portion of the hemisphere and the ring held by the base;

FIG. 10 is a sectional view similar to FIG. 9 with the drive gear engaged;

Figure 1:
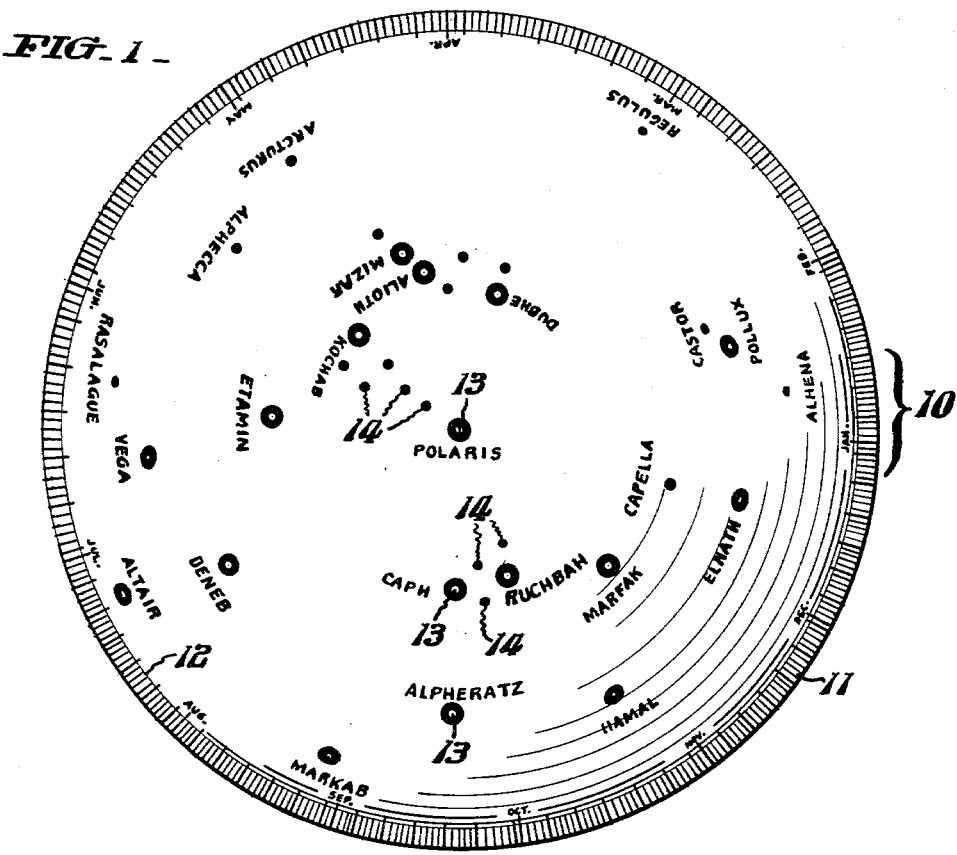
FIG. 1 is a top view of one form of the hemisphere of this invention.
Figure 2:
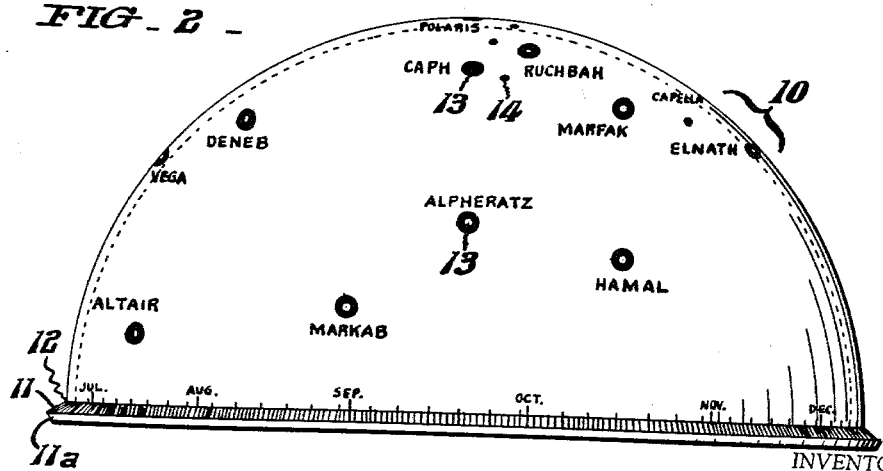
FIG. 2 is a side elevational view of the hemisphere shown in FIG. 1.

One form of the hemisphere component of the instrument of my invention is shown in FIGS. 1 and 2. The hemisphere component 10 has the shape of half a sphere to which an annular peripheral flange 11 is joined around the annular base edge 12 of the hemisphere 10. The hemisphere 10 is preferably composed of a transparent plastic material upon which the names of various stars are written so as to be clearly visible when viewing the hemisphere from the outside, as in FIGS. 1 and 2, or through the inside looking out. The exceptional bright and well known stars of the North Hemisphere, such as Vega, Alpheratz, Polaris and Dubhe are marked on the hemisphere by a number of small holes or openings 13 punched through the plastic material. In addition, these openings 13 are encircled by black markings so that they are readily visible and so that when the hemisphere is aimed at the stars, as explained infra, the light from the stars will be particularly evident to the observer when it appears directly through the openings 13. Not all of the stars marked on the hemisphere are identified by name and the unnamed ones are shown by small black dots 14. Examples of these stars are those comprising the Great Dipper, in addition to Dubhe, Alioth and Mizar, and those of the Smaller Dipper, in addition to Polaris and Kochab, but it should be seen that a good number of the more familiar stars are marked by name on the hemisphere 10. It should be understood that even as the names of the stars are printed on the outside surface of hemisphere 10, these stars can still be identified by the names when the hemisphere is viewed through the inside looking outward.

Polaris is positioned directly on the axis of the hemisphere 10 and this star is used whenever visible to orient the hemisphere as to latitude, as explained infra. It should be apparent that the hemisphere can have marked, thereon, any of a wide choice of visible stars and that these stars can be identified on the hemisphere by openings, dots or by other means. As a modification, the hemisphere component can be composed of a dense or non-transparent material and the stars identified when their light appears through the positioned openings 13. In any construction, the hemisphere 10 represents the celestial sphere as it is viewed from the earth's surface and the stars are positioned relative to each other around the surface of the hemisphere 10. The hemisphere portrays the selected stars as fixed bodies rotating around a common point which is Polaris. Of course, it is understood that the revolution of the earth causes these stars to appear to rotate around Polaris and that Polaris is useful for navigation purposes because its position is roughly along the longitudinal axis of the earth. Similarly, the stars selected for marking on the hemisphere must be those of the northern hemisphere if the observer is positioned north of the equator as the stars of the southern hemisphere would be largely invisible to the observer so positioned. However, when this instrument is used in the southern hemisphere, a hemisphere having the southern stars is substituted.

Uniformly marked around the peripheral flange 11 of hemisphere 10 are the days and months of a calendar year. The units shown in FIGS. 1 and 2 represent one day. As the position of each star in relation to the adjacent stars does not vary for observation purposes, but the entire group of stars apparently rotates as a single unit around Polaris, the stars shown in FIGS. 1 and 2 on the hemisphere 10 are positioned on the hemisphere as they appear at a particular time and place on the earth's surface. In relation to the calendar shown on flange 11, the stars are positioned as viewed from a position along the prime meridian at midnight on September 21, dispensing with the latitude of such stars. In other words, the star pattern shown on the hemisphere in FIGS. 1 and 2, wherein the three stars Polaris, Caph, and Apheratz form a straight line perpendicular to the horizon, is the pattern which would be seen, dispensing with latitude, from Greenwich, England at midnight on September 21. The remaining stars on the hemisphere are positioned in relation to these stars and each other. On October 6, the perpendicular line identified above would be viewed at Greenwich, England at 11:00 p.m. or 2300 hours, on October 21 at 10:00 p.m. or 2200 hours and so, on, as fifteen degrees equals one hour and with 365 days in one year, the celestial sphere advances one hour for each fifteen days.

As the days and months of the year pass, the visible star pattern of the celestial sphere appears to change and certain stars that were visible during the fall months are visible no longer at the same times or in the same location during the other months of the year. In essence, the pattern of stars shown on the celestial hemisphere of FIGS. 1 and 2, is that which would be visible to an observer standing on the North Pole. If the observer would step away from the North Pole along the prime meridian he would recognize the particular location of the stars as tilting away from directly overhead and forming a measurable angle away from a vertical line through the observer's position. As many stars forming part of this star pattern will be visible from other positions on the earth's surface in the northern hemisphere at identified times throughout the year, the remaining mechanism of this invention will provide the means for relating the positioning of this hemisphere to the local time of the observer thereby providing the position of the observer away from the prime meridian. It is understood that as the latitude of the observer increases, a progressively greater sector of the northern celestial sphere will become invisible, however, hemisphere 10 is provided with a great number of stars so that a few will always be visible regardless of the latitude of the observer in the northern hemisphere.

Figure 3:
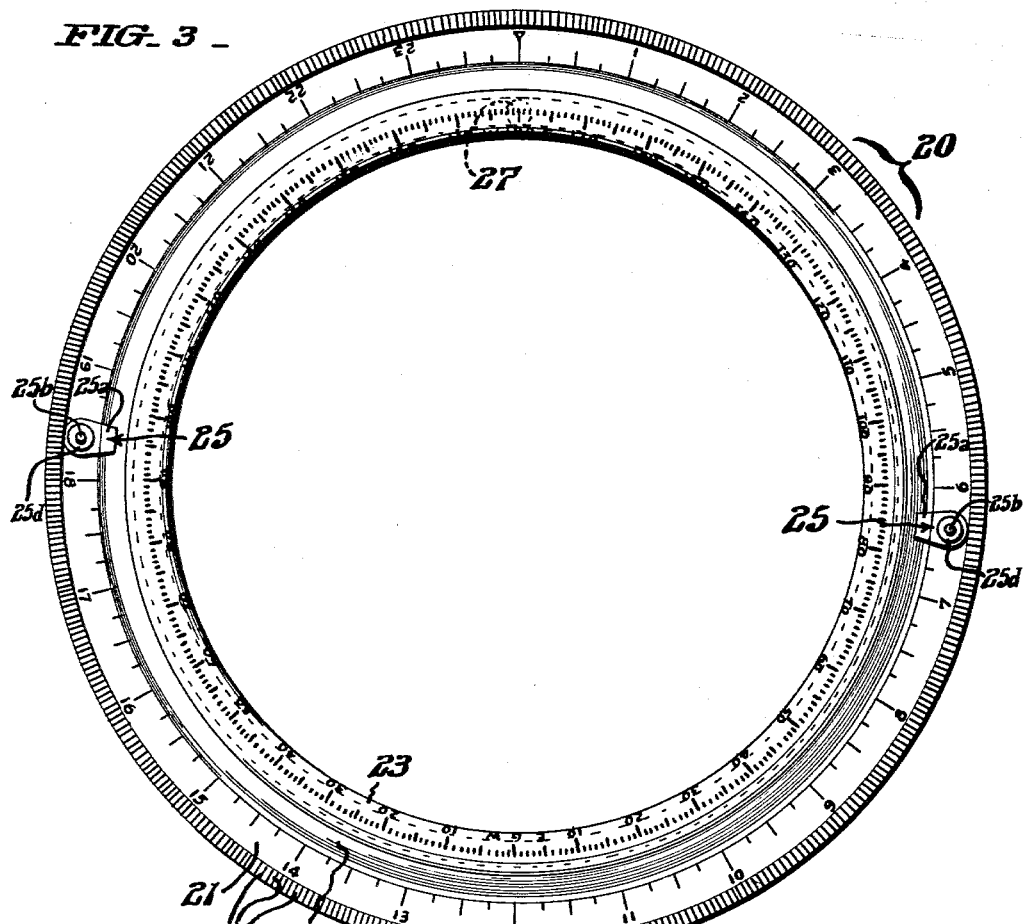
FIG. 3 is a top view of one form of the hour and longitude ring of this invention.
Figure 4:
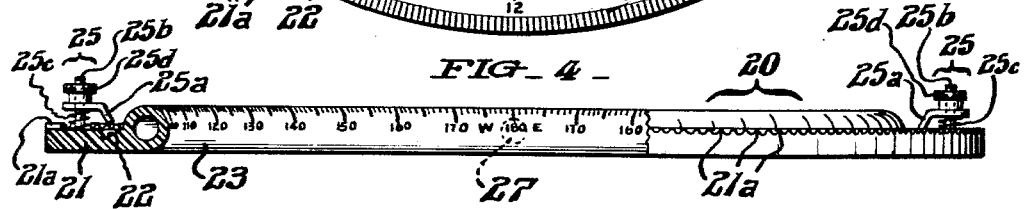
FIG. 4 is a side elevational view, partly broken away and in section, of the ring shown in FIG. 3.
Figure 7:
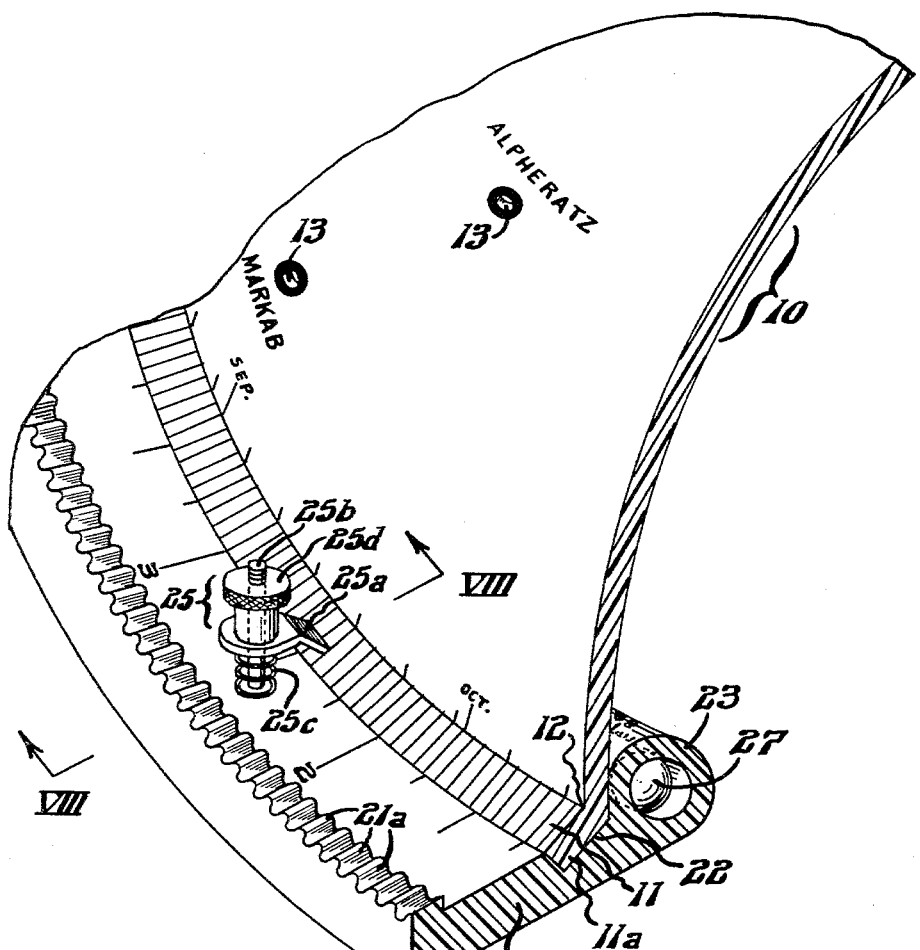
FIG. 7 is a fragmentary perspective view showing a portion of the hemisphere mounted on the hour ring.
Figure 8:
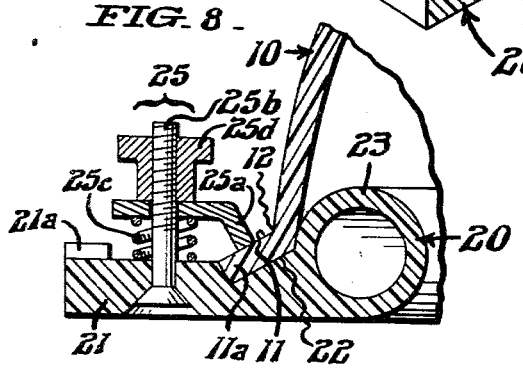
FIG. 8 is a sectional view of the hemisphere and ring taken along the lines and arrows VIII—VIII of FIG. 7.

FIG. 3 shows an hour and longitude ring 20, upon which the hemisphere 10 is mounted and is secured by two fasteners 25 attached to ring 20. The ring 20, as shown also in FIG. 4, has an annular flat peripheral portion 21 which extends outwardly and beyond a circular groove 22 in which the beveled edge 11a of the peripheral flange 11 of the hemisphere rests. The inner portion of ring 20 comprises a hollow tube 23 which extends completely around ring 20 on the inside edge. Tube 23 is preferably composed of a transparent, plastic material which is uniformly marked in degrees of longitude around a complete circle. From a beginning point marked "G" or Greenwich, the tube 23 is numbered to 180 degrees west longitude and to 180 degrees east longitude. Within hollow tube 23 is mounted a marking ball 27 which is free to move completely around tube 23. Ball 27 is preferably painted in a dark color so that it is readily visible through the sides of tube 23. The annular peripheral portion 21 of ring 20 is uniformly marked on the top inner side into twenty-four hours. Toward the outside of portion 21 is a series of extending teeth 21a which form a gear train. Fasteners 25, positioned on both sides of ring 20, consist of a spur 25a, a vertical threaded bolt 25b, a spring 25c to press the spur 25a upwards, and a nut 25d threaded to hold the spur 25a in position under proper tension. When the hemisphere 10 is mounted on ring 20, the spurs 25a of both fasteners 25 are rotated away from groove 22. Thereupon, the hemisphere, and in particular the beveled edge 11a of the peripheral flange 11 is positioned within groove 22 and the spurs 25a returned to the position shown in FIG. 4, thus locking the hemisphere and ring together as shown in FIGS. 7 and 8.

Figure 5:
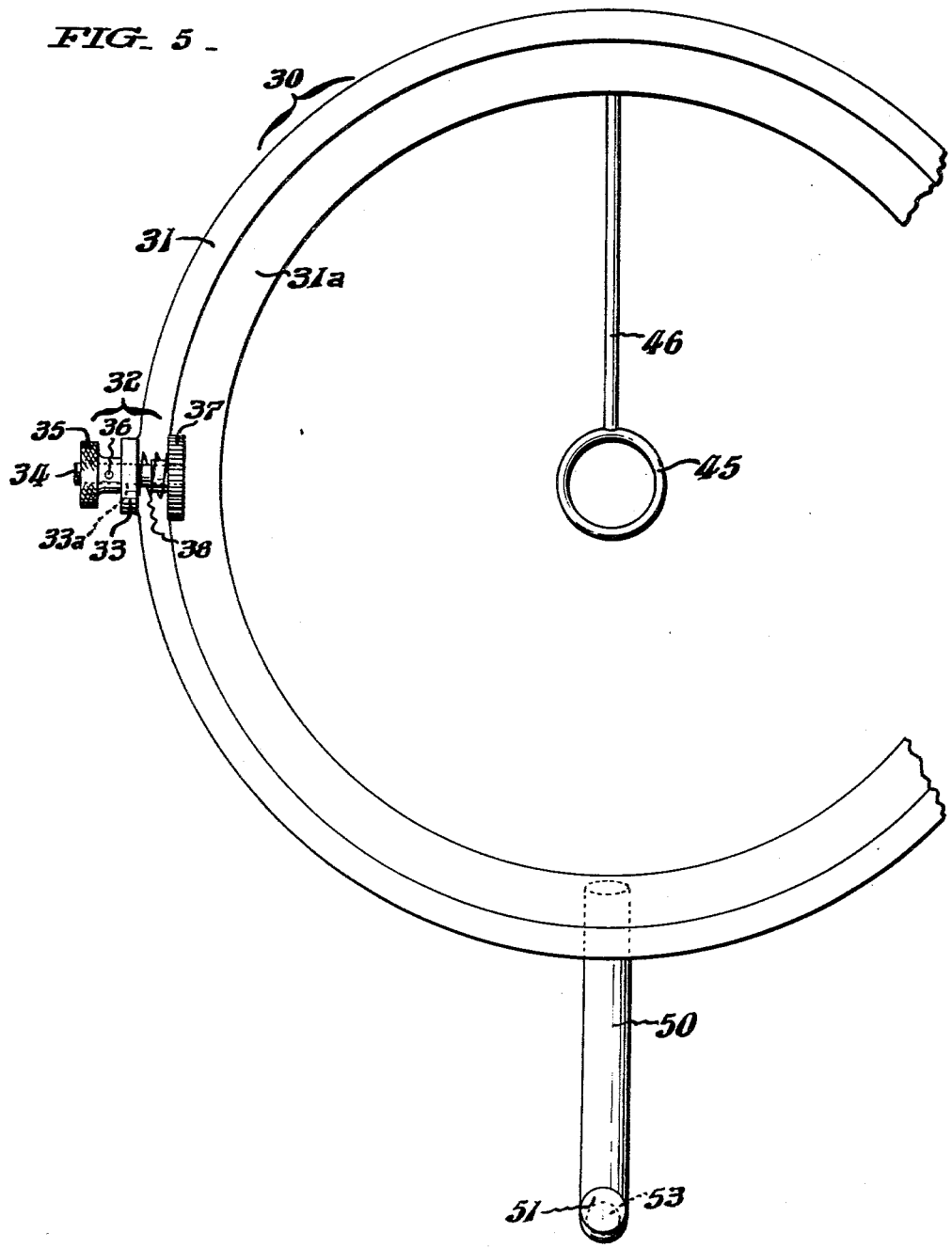
FIG. 5 is a front elevational view of one form of the holder of the instrument of this invention.
Figure 6:
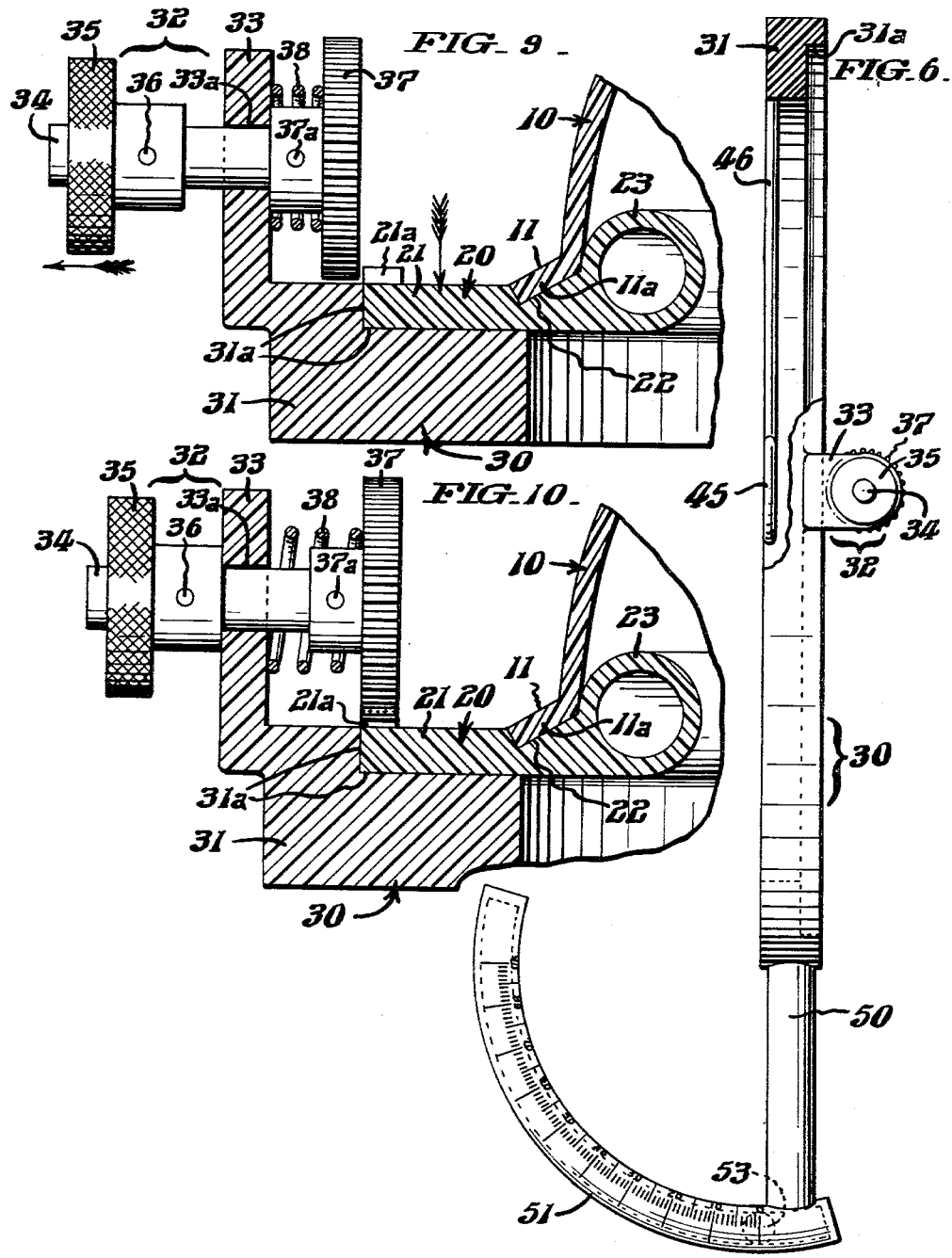
FIG. 6 is a side elevational view of the holder shown in FIG. 5.

The base or holder 30 supports both the coupled ring and hemisphere when the instrument of this invention is operated. As shown in FIGS. 5 and 6, holder 30 consists of a ring-shaped portion 31 in which an annular recessed area 31a is constructed to receive the ring 20. The holder 30 has a drive mechanism 32 attached to one part of ring portion 31. The drive mechanism 32 comprises an upstanding flange 33 having a bore 33a through which fits a shaft 34. On its outer end, shaft 34 has knob 35 attached by means of a pin 36, and on the inner end, shaft 34 has a spur gear 37 held to the shaft 34 by a pin 37a. A spring 38 is positioned between flange 33 and spur gear 37 so as to yieldingly press the gear away from the flange and into contact with the series of teeth 21a of the ring 20, as shown in FIGS. 9 and 10. When ring 20 is inserted into recessed area 31a of holder 30 as indicated by the arrow in FIG. 9, the knob 35 is withdrawn in the direction of the arrow so as to position gear 37 clear of recessed area 31a. The drive mechanism 32 serves not only to rotate ring 20 and thereby rotate the mounted hemisphere 10 while the ring is in position on holder 30, but the mechanism 32 also holds the ring 20 tightly within the recessed area 31a of the holder 30. A viewing eye piece 45 is positioned at the center of the holder 30 and eyepiece 45 is held by a strut 46 extending from the side of holder 30 as shown in FIGS. 5 and 6.

Figure 11:
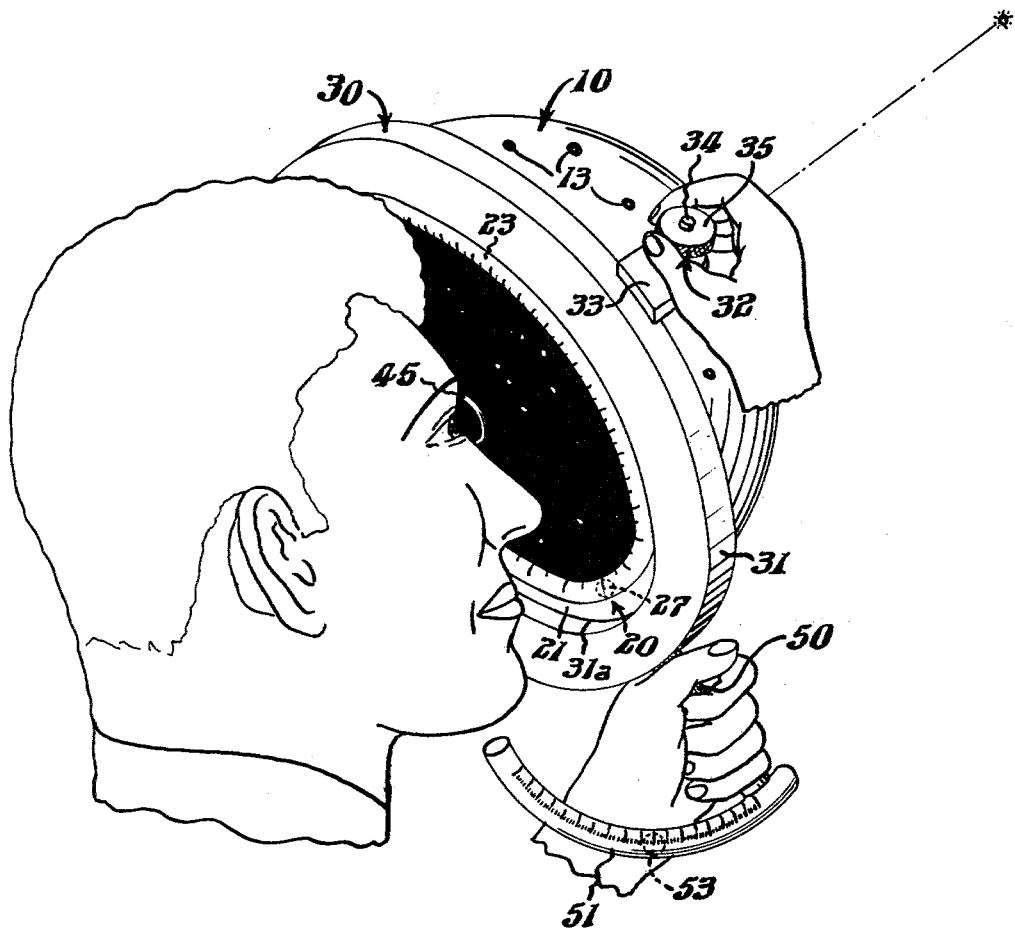
FIG. 11 is a perspective view illustrating the manner of use of this form of the invention.

Attached to the circumference of holder 30 at one point is a handle 50 which provides means for the position indicator to be held before the eye of the viewer as shown in FIG. 11. Attached to the end of handle 50 is the latitude indicating tube 51. Tube 51 is curved along a quadrant and is preferably composed of a semi-transparent material similar to that of tube 23 of ring 20. Tube 51 has a series of markings extending from zero, which is marked in a vertical position at the base of the tube, to 90 degrees which is marked substantially horizontal at the extended point. Within tube 51 is a black ball 53 which is free to roll along the length of the tube and provide an indication of angle. It should be understood that when the position indicator and, in particular, the holder 30, is held in substantially a vertical position, as shown in FIG. 6, the ball 53 will indicate or will remain behind the marking showing a zero. As the holder is moved away from the vertical position, this angle of inclination will be indicated by the tube 51 as ball 53 rolls along in the curved tube and assumes a position behind one of the subsequent markings.

In operation, this form of the position indicator of my invention functions substantially as follows. The hemisphere, having the days of the year marked around its peripheral flange 11, is mounted on ring 20 and the fastening devices 25 revolved so as to hold the hemisphere on the ring. The observer then sets the time of day, calculated in Greenwich time, in the instrument by rotating the hemisphere or the ring in relation to each other. As shown as an example in FIG. 7, ring 20 is positioned so that the numeral 3 is directly opposite September 10. As Greenwich time is five hours ahead of eastern standard time, the observer in effect would be using this instrument in the eastern time zone on the 9th of September at 10:00 p.m. or 2200 hours. After the hemisphere and time ring 20 are set according to the time of observation, the fasteners 25 are tightened by turning nuts 25b so that the spurs 25a of the fastening devices 25 are tightly in place maintaining the same relationship while the instrument is sighted against the stars.

The ring and hemisphere are then mounted on holder 30 by withdrawing gear 37 and inserting the ring within the annular recessed area 31a. The gear 37 is then allowed to assume, under spring tension, the position shown in FIG. 10 whereby it engages spurs 21a positioned around the peripheral edge of the ring 20.

The indicator is then grasped in one hand as shown in FIG. 11 and the observer's eye is placed adjacent the viewing piece 45. The observer views the stars through the eye piece 45 and positions the indicator so that the light from Polaris is visible through one axially aligned opening 13 which is identified on the hemisphere as Polaris. Continuing to maintain the sight of Polaris, the operator rotates knob 35 causing ring 20 to rotate slowly within holder 30. The operator continues to rotate this knob until a number of identified stars in addition to Polaris become visible through other selected openings 13 made in the hemisphere. As the drive mechanism operates in both directions, the operator can rotate ring 20 in either direction so as to find the particular star pattern he seeks. When a plurality of identified stars are visible through a plurality of identified openings 13 or dots 14 in the hemisphere, that is, when the light from each of a number of stars appears through the proper openings on the hemisphere, the operator, at the time previously set in the instrument, without moving the indicator, glances downward to observe the position of ball 27 within tube 23 and, specifically, to read his position in degrees of longitude east or west of Greenwich. Similarly, the operator glances at tube 51 in which ball 53 marks his position in degrees of latitude.

As the principle of operation of this instrument is so simple, the instrument is particularly useful as a teaching aid and a tool for amateurs. As partially explained supra, as an observer on the earth's surface moves from the equator toward the North Pole, the angle existing between the line of sight directed to Polaris and an imaginary line drawn from the earth's center through the observer's position on the earth's surface steadily decreases. That is, at the North Pole there is no angle as the lines coincide but as the latitude of the observer increases this angle increases. Therefore, the position of ball 53 in tube 51 provides an indication of the angle existing between these two lines and hence the latitude of the observer. It is noted that the markings on tube 51 are arranged converse to the actual angle existing between the Polaris line and the vertical line because degrees of latitude extend from zero at the equator to 90 degrees at the North Pole. In determining the longitude of the observer's position, utilization is made of the principle that if the position of the star pattern on the prime meridian at a certain time of the year is known, then the relative displacement of the visible star pattern in relation to that of the prime meridian at a known time will provide an indication of longitude or distance east or west of the prime meridian. In the instrument and method of observation of this invention the gravity controlled ball 27 in tube 23 seeks the lowest point in the longitude tube thereby identifying the imaginary line drawn from the earth's center to the point of observation on the earth's surface as explained supra. The ball 27 and longitude scale indicate degrees east or west of the prime meridian as the longitude tube is rotated with the hemisphere in seeking the position of the selected, visible stars. Further, in connection with the use of this instrument Greenwich time is used, as the measurements taken involve the difference in position of the star pattern visible by the observer at one particular time and that same pattern visible on the prime meridian at the same time.

It should be understood that if Polaris is not visible at the time of sighting, the operator can effectively establish his position by reference and sighting to a number of other visible stars which are identified on the hemisphere. Further, the operator may use more than one group of visible stars in each sighting by taking a series of sightings in which a different group of stars are used each time thereby more precisely defining his position.

As this form of the instrument of my invention utilizes gravity to provide indications of longitude and latitude, it is recognized that other gravity indicating means in addition to the marking balls shown may be used without departing substantially from the principles described herein. Similarly, the latitude indicating tube can be mounted on the instrument at a different point or constructed along a different line. Other materials, modifications and adaptations can be used, and a different configuration of eye piece, or handle or drive mechanism can be successfully adapted without departing substantially from the spirit and scope of this invention and of the appended claims.

I claim:
1. A position indicator for locating the position of an observer on the earth's surface in terms of longitude in relation to the stars of the celestial sphere, said indicator comprising
    a truncated sphere having means for indicating thereon the relative celestial position of a plurality of selective stars,
    means associated with said sphere for relating the position of the stars to a particular day in the year as viewed from one location of the earth's surface,
    means independent of the sphere for relating the position of the sphere to the time of day of observation, said independent means having longitudinal markings and a gravity responsive indicator whereby when the sphere is positioned by the observer similarly to the relative position of the identified stars of the celestial sphere, the gravity responsive indicator responds in relation to the longitudinal markings to provide an indication of longitude.

2. A position indicator for locating the position of an observer on the earth's surface in terms of longitude and latitude in relation to the stars of the celestial sphere, said indicator comprising
    a truncated sphere having means for indicating thereon the relative celestial position of a plurality of selected stars,
    means associated with said sphere for relating the position of the stars to a particular day in the year as viewed from the prime meridian,
    means independent of the sphere for relating the position of the sphere to the time of day of observation, said independent means having longitude markings and a gravity responsive indicator, and
    latitude indicating means including a scale and a gravity responsive indicator, said means positioned to operatively indicate degrees of the angle existing between the longitudinal axis of the sphere and an imaginary vertical line drawn at the earth's surface at the point of observation.

3. A position indicator for locating the position of an observer on the earth's surface in terms of longitude and latitude in relation to the stars of the celestial sphere, said indicator comprising
    a truncated sphere having means for indicating thereon the relative celestial position of a plurality of selective stars,
    means associated with said sphere for relating the position of the stars to a particular day in the year as viewed from the prime meridian,
    means independent of the sphere for relating the position of the sphere to the time of day of observation, said independent means having longitude markings and a gravity responsive indicator,
    a holder for supporting the sphere and the independent means for rotary movement thereon, means associated with said holder for rotating both the sphere and the independent means as a single unit, and
    latitude indicating means including a scale and a gravity responsive indicator mounted on the holder, said means positioned to operatively indicate degrees of the angle existing between the longitudinal axis of the sphere and an imaginary vertical line drawn at the earth's surface at the point of observation.

4. The position indicator as defined in claim 3 wherein is provided viewing means mounted on said holder and positioned along the longitudinal axis of the sphere whereby the indicator is positioned by an observer by sighting through the viewing means and rotating the sphere until the star indicating means causes said sphere to assume a position similar to that of the stars of the celestial sphere.

5. The position indicator as defined in claim 4 wherein the means independent of said sphere for relating the position of the sphere to the time of day of observation comprises an annular member adapted to connect with the base of said truncated sphere, said member having marked around its periphery a first scale divided into the hours of one day and a second scale divided into units of longitude, said second scale being shaped as a tube and having a marking ball mounted for free movement therein.

6. A position indicator providing means for locating the position of an observer on the earth's surface in terms of longitude and latitude in relation to the stars of the celestial sphere, said indicator comprising
- a hemisphere having means thereon for indicating the relative celestial position of a plurality of stars, said hemisphere being equally divided around its peripheral edge into units representing the days of one calendar year,
- an annular member, independent of the hemisphere, having means for rotatably supporting the hemisphere thereon, said member having arranged around its circumference, a first series of markings comprising the hours of one day and a second series of markings in units of longitude, means associated with the markings of longitude to indicate the center of the earth,
- a holder supporting the annular member for rotary movement and having viewing means attached thereto, said viewing means being positioned on the axis of the hemisphere in the plane of the holder,
- gravity responsive means for determining the degree of angle existing between the plane of the holder and a vertical plane at the point of observation, said means having markings of latitude thereon, and
- means for rotating the hemisphere and annular member as a single unit in relation to the holder so as to position the star indicating means on the hemisphere similarly to the position of the visible stars as seen through the viewing means so that when the hemisphere is so positioned, the gravity responsive indicators provide indications of the longitude and latitude of the position of the observer.

References Cited by the Examiner
UNITED STATES PATENTS

| 949,348 | 2/10 | Baker | 35—43 |
| 2,372,387 | 3/45 | Hagner | 35—43 |
| 2,399,365 | 4/46 | Link | 33—1.5 X |
| 2,460,346 | 2/49 | Hagner | 33—61 |
| 2,508,027 | 5/50 | Hoffmeister. | |

FOREIGN PATENTS

| 719,033 | 3/42 | Germany. |
| 218,527 | 7/24 | Great Britain. |

ISAAC LISANN, *Primary Examiner.*